April 24, 1962 P. MANDEL 3,031,569

RADIO COMMUNICATION APPARATUS USING DIVERSITY METHOD

Filed Dec. 9, 1958 2 Sheets-Sheet 1

INVENTOR
PAUL MANDEL
BY Paul M. Craig, Jr.
ATTORNEY

April 24, 1962 P. MANDEL 3,031,569

RADIO COMMUNICATION APPARATUS USING DIVERSITY METHOD

Filed Dec. 9, 1958 2 Sheets-Sheet 2

INVENTOR
PAUL MANDEL
BY Paul M. Craig, Jr.
ATTORNEY

United States Patent Office 3,031,569
Patented Apr. 24, 1962

3,031,569
RADIO COMMUNICATION APPARATUS USING DIVERSITY METHOD

Paul Mandel, Paris, France, assignor to Compagnie Generale d'Electricite, Paris, France, a French corporation Filed Dec. 9, 1958, Ser. No. 779,081
Claims priority, application France Feb. 17, 1958
12 Claims. (Cl. 250—20)

The present invention relates to radio receiver systems of the kind comprising two or more receivers whose outputs are combined to provide a single output and more particularly to diversity receiving systems.

The advantages of diversity reception have been known for a long time. In diversity reception, advantage is taken of the fact that the signals at two separate receiving sites or two separate frequencies only infrequently fade at the same time. For this reason, it is possible to improve the reliability of reception by combining the two or more signals so as to obtain a resulting signal having a signal-to-noise ratio better than the same ratio for the individual combined signals or by selecting between them at a given time the better signal as characterized by said ratio.

It is possible to combine in different ways the output signals of the several receivers; for instance, it is possible to keep only the best signal, that is to say, the one which presents the highest signal-to-noise ratio by automatic selection; or, it is also possible to combine in a permanent manner the signals of the different receivers. The latter method gives particularly advantageous results since it not only increases the reception reliability but it also allows to obtain a resulting signal, the signal-to-noise ratio of which is greater than the highest signal-to-noise ratio of the signals received by the different receivers, i.e., to improve the overall signal-to-noise ratio per se. Furthermore, it prevents the occurrence of transient phenomena which may be caused by the switching process.

It is known that the increase of the signal-to-noise ratio obtained by the method of continuous combination results from the fact that, whereas it is the output signal amplitudes that add up together, it is the noise powers that add up together if there is no correlation existing between the noises issuing from the two receivers, which is the case if each of these noises is substantially restricted to the noise portion generated in the corresponding receiver.

More specifically, by suitably choosing the overall gain of the amplifiers in the different channels, it is possible to obtain a resulting signal-to-noise power ratio equal to the sum of the signal-to-noise power ratios existing at the output of the different receivers. A demonstration of this remarkable characteristic is found in a note of D. G. Brennan, published in the October 1955 issue of the "Proceedings of the IRE" (page 1530). The author demonstrates that the voltage gains must be, for the different combined receiver outputs or channels, inversely proportional to the noise power of the respective channel and proportional to the root mean square of the signal as a function of time.

If the levels of the signals received before combination are adjusted so as to normally have substantially equal amplitudes in the associated channels, by means of limiters in F.M. receivers and A.G.C. circuits in A.M. receivers the result is simplified; it is then possible to dispose on each channel a circuit control device known as combiner or combining amplifier of which the gain is inversely proportional to the noise power of the respective channel. Prior art diversity receiving systems have been developed in which each receiver output channel is provided with a variable gain amplifying stage and means for automatically varying the gain of this stage in dependence upon the amplitude of voltages representative of noise located in a frequency band at least mainly outside that occupied by a desired signal, so that the gain of each receiver varies inversely with the magnitude of said noise.

In these prior art systems, each receiver output channel comprises a variable gain combiner tube and means to control the gain of said tube inversely proportionally to the noise power of said receiver. The control means of each variable gain tube usually includes in series a high-pass or band-pass filter, the filters of the different channels allowing to pass identical frequency bands in all the channels, a noise amplifier and a rectifier whose output noise signal $N'_1$, $N'_2$, . . . controls the variable gain tube. Thus each receiving channel comprises its own noise amplifier; it results that, for a good and stable operation, all the noise amplifiers must have quite equal gains. Furthermore, if the noise amplifiers are linear amplifiers, the gain of the variable gain tube of each channel is proportional to the absolute noise power $N_1$, $N_2$, . . . encountered in said channel. As, when the received signals at the two receivers are not equal, the receiver noise outputs are unequal and inversely proportional to the amplitude of the received signals, it is desirable, in order that the overall combiner output signal normally be of substantially constant amplitude, that the gain of a variable gain tube of a channel vary in dependence upon the relative noise power $N_1/(N_1+N_2)$, $N_2/(N_1+N_2)$, . . . of the said channel. Systems including a plurality of noise amplifiers which have to be quite identical and adjusted in such a manner that the sum of their output powers be constant is rather difficult to achieve and operate.

The object of the invention is to provide a radio receiver system of the kind set forth in which the combined output of the several receivers has normally constant amplitude and a signal-to-noise power ratio equal to the sum of the individual signal-to-noise power ratios of the receivers.

According to the present invention, in a radio receiver system comprising two or more receivers whose output channels are to be combined, each receiver is provided with a variable-gain amplifying stage, all said stages forming together, with an adding means of their outputs, a combiner, and the whole system is provided with a common amplifying stage gain control circuit including a plurality of input band-pass filters having the same band width and pass-bands shifted apart in the frequency spectrum from one filter to another, a common noise amplifier having an input connected in parallel to said input filters, a plurality of output filters respectively identical to the input filters and connected in parallel to the output of said common noise amplifier and a plurality of rectifiers connected respectively between said output filters and the gain control terminals of said variable-gain amplifying stages.

It must be well understood that all the noise power components pertaining to the several receiving channels are amplified together in the same noise amplifier having a constant output power and that the several noise power components are discriminated by being derived from the receivers through pass-band filters having pass-bands spaced apart in the frequency range.

More specifically, the diversity system according to the invention comprises:

(1) Filters to insure discrimination of the noises selected on the various reception channels, the pass-bands of which, distinct and without any overlapping, are not included in the band which is used for the transmission of the modulation frequency signals;

(2) A common linear amplifier to amplify these noises, comprising an automatic gain control circuit in order to make its output power constant;

(3) Filters for the separation, according to their band of frequencies, of the amplified noise signals at the output of the common amplifier; and (4) Means for deriving from said output noise signals control voltages and for applying these control voltages to the gain control terminals of the amplifying stages of the combiner.

The common amplifier must have a good linearity so that the noise signals of the various channels have all the same gain. In these conditions, if we designate by C the output power of the amplifier, the powers of the noise signals of the various channels at the output of the amplifier are expressed as follows:

$$N'_1=\frac{CN_1}{N_1+N_2+\ldots N_p}\;N'_2=\frac{CN_2}{N_1+N_2+\ldots N_p}$$
$$N'_p=\frac{CN_p}{N_1+N_2+\ldots N_p}$$

$N_1, N_2, \ldots N_p$ designating the powers of the selected noise signals of the channels 1, 2, . . . $p$ at the input of the common amplifier, and $N'_1, N'_2, \ldots N'_p$ the powers of the noise signals corresponding to the output of the common amplifier.

After separation by means of filters one obtains by quadratic or square law detection gain control voltages proportional to $N'_1, \ldots N'_p$ and equal to:

$$U_1=\frac{C'N_1}{N_1+N_2+\ldots N_p}\;U_2=\frac{C'N_2}{N_1+N_2+\ldots N_p}$$
$$U_p=\frac{C'N_p}{N_1+N_2+\ldots N_p}$$

where $C'=kC$, $k$ being a constant depending upon the choice of the rectifiers used for detection.

The foregoing objects and advantages and others are obtained according to the invention in a manner which will be fully understood from the following description and the drawing in which.

Figure 1:
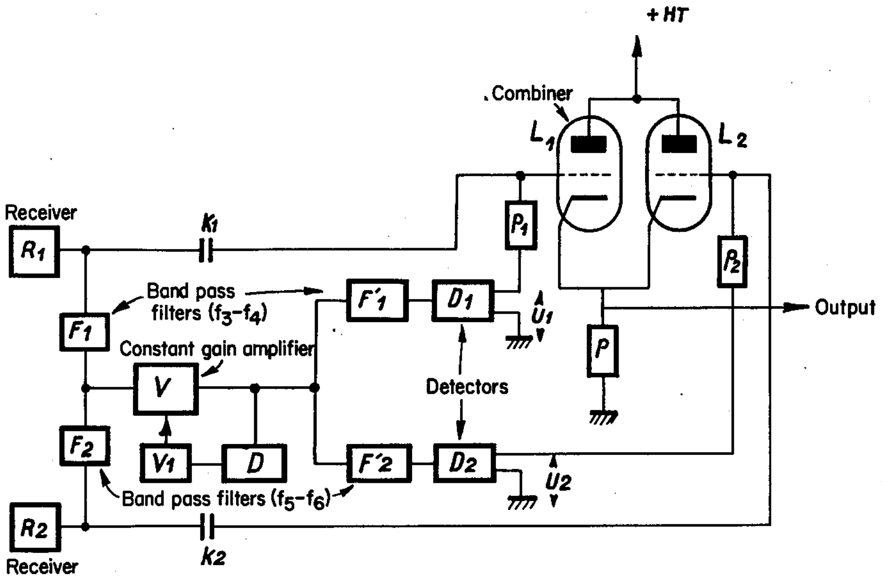
FIG. 1 is a schematic representation of a dual-channel receiving system embodying the present invention.

In FIGURE 1, $R_1$ and $R_2$ designate the receivers of the two channels, the output signals of these two receivers being adjusted to the same level and to be of the same phase. The signal is constituted, for instance, by the signals of a group of communication channels belonging to a multiplex transmission radio link and it occupies for each one of these two receivers the same band of modulations frequencies distributed between $f_1$ and $f_2$ c/s.

At the output of each of these receivers two paths are disposed in parallel, namely the signal path and the noise signal path. The signal path comprises a capacitor $K_1$ (or $K_2$), and leads to grid $G_1$ (or $G_2$) of one of the tubes $L_1$ (or $L_2$) constituting a combiner-amplifier of a known type, while the other path insures the detection of the noise signal and the selection of said noise signal by means of a band filter $F_1$ (or $F_2$) according to whether it is derived from the first or second receiver.

Figure 2:
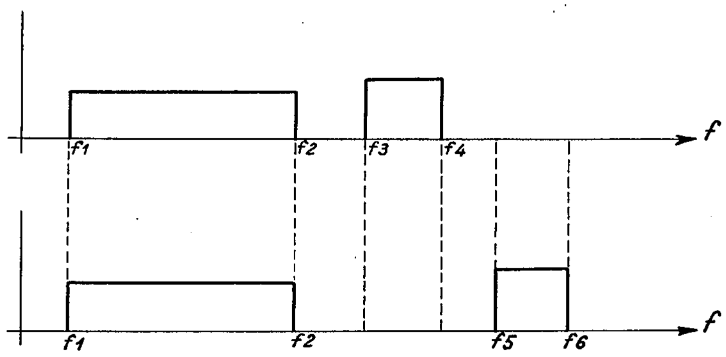
FIG. 2 illustrates a possible relationship between signal frequency bands and the frequency bands from which noise signals are obtained in the system of FIG. 1.

FIGURE 2 shows the relative disposition of the pass-bands $f_3$—$f_4$ and $f_5$—$f_6$ of the filters $F_1$ and $F_2$, respectively, as compared to the signal band $f_1$—$f_2$. The location in the frequency range and the common width of bands $f_3$—$f_4$ and $f_5$—$f_6$ are chosen in such a manner that the noise powers selected in these bands are proportional to the noise power in the signal band.

The noise signals produced by filters $F_1$ and $F_2$ are applied to a common noise amplifier V. The noise amplifier V comprises an automatic gain control constituted by a rectifier D connected to the output of amplifier V and an auxiliary amplifier $V_1$ whose output is connected, as well known, to the grid of a variable gain tube inserted in amplifier V. The automatic gain control thus obtained is sufficiently accurate in order to keep the output power of amplifier V constant within the utilization range.

As previously indicated, the amplifier V must present a sufficient linearity so that the nose powers collected at the output are in the same ratio as the noise powers selected by the filters from the receiving channels.

At the output of amplifier V the noise signals from receivers $R_1$ and $R_2$ are separated by means of filters $F'_1$ and $F'_2$, the pass-bands of which are the same as the ones of filters $F_1$ and $F_2$.

Thus it is seen that the powers corresponding to noises selected in the respective channels at the output of amplifier V are:

$$N'_1=\frac{CN_1}{N_1+N_2}\;N'_2=\frac{CN_2}{N_1+N_2}$$

Two quadratic or square law rectifiers $D_1$ and $D_2$ are connected at the output of filters $F'_1$ and $F'_2$ and respectively furnish the voltages:

$$U_1=\frac{C'\frac{N_1}{N_2}}{\frac{N_1}{N_2}+1}\;U_2=\frac{C'}{\frac{N_1}{N_2}+1}$$

which depend only upon the ratios of the noise powers.

These voltages $U_1$ and $U_2$ are respectively applied through resistors $\rho_1$ and $\rho_2$ between ground and the grids $G_1$ and $G_2$ of tubes $L_1$ and $L_2$ of the combiner-amplier, which is, for instance, of the type described in an article by MACK in "Proceedings of the IRE," October 1955, pages 1287–1288. The tubes $L_1$ and $L_2$ have both of their cathodes connected through a common load resistance $\rho$ to ground. The output signal with improved signal-to-noise ratio appears across resistance $\rho$.

This device is designed so that the gains of the two channels, after amplification by tubes $L_1$ and $L_2$, which are represented by control voltages $U_1$ and $U_2$, only depend upon the difference E of said voltages.

In fact:

$$U_1+U_2=C'$$
$$U_1-U_2=E$$

whence:

$$U_1=C'\frac{\frac{N_1}{N_2}}{\frac{N_1}{N_2}+1}$$

$$U_2=C'\frac{1}{\frac{N_1}{N_2}+1}$$

$$E=C'\frac{\frac{N_1}{N_2}-1}{\frac{N_1}{N_2}+1}$$

Figure 3:
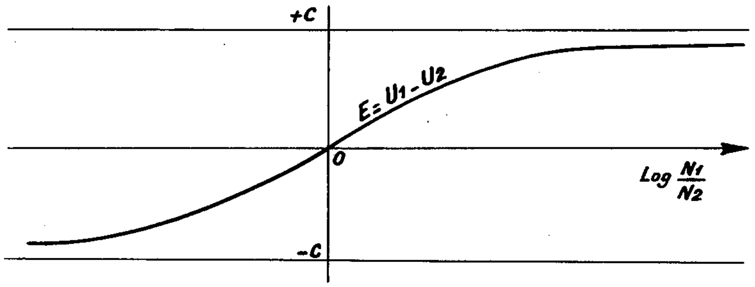
FIG. 3 is a curve relating to the control voltage of the combiner as a function of the logarithm of the ratio of noise powers in the two receiving channels.

The variation of E as a function of the logarithm of the ratios of noise powers is shown on FIGURE 3.

The voltage E is null for $N_1=N_2$, and it is equal to C' when:

$$\text{Log}\,\frac{N_1}{N_2}=+\infty$$

and is equal to $-C'$ when:

$$\text{Log}\,\frac{N_1}{N_2}=-\infty$$

The polarities of $U_1$ and $U_2$ are chosen in a manner such that the gain of the combiner for each channel decreases when the noise power of the respective channel increases.

The combinator insures equal gains on both channels when $N_1=N_2(E=O)$, and it annuls the gain of the channel of which the noise power is much greater than the one of the other channel ($E=\pm C'$).

It is easy to see that the device according to the invention may be applied to a diversity system operating by selection of the best channel. The amplifiers of the combiner, of which the gains are a continuous function of the control voltages, are in such case replaced by circuit control devices which may assume two states: one a state of transfer and the other a state of blockage, and are susceptible to rapidly switch from one state to the other for some predetermined values of the control voltages.

The structure of a diversity system according to the invention and having a number of receivers or channels different from and greater than two would obviously be derived from the system disclosed in detail by successive groupings of the pairs of receivers or channels.

In the case of three channels for instance, the grouping of two channels furnishes a resulting signal, the signal-to-noise ratio of which is the sum of the signal-to-noise ratios of the two channels. If then this resulting signal is associated with the signal of the third channel after these signals have been brought to the same level, a new signal is obtained, the signal-to-noise ratio of which is equal to the sum of the signal-to-noise ratios of the three channels. This result is obviously general for any number of reception channels whatever their groupings, since the signal-to-noise ratios always add up under the condition of combining signals of identical levels.

While I have shown and described several embodiments in accordance with the present invention, it is understood that the same is not limited thereto but is susceptible of many changes and modifications within the scope and spirit of the present invention, and I, therefore, intend to cover all such changes and modifications as are encompassed by the scope of the appended claims.

I claim:

1. In a receiving circuit for a wireless communication installation, a plurality of receivers provided to receive signals containing the same information, signal output means, control means operatively connected to each of said receivers for controlling the passage of said information signals from the respective receiver to said output means, filter means for deriving the noise powers of signals from each of said receivers including a band pass filter connected to an output of each of said receivers, the respective filters being tuned to different non-overlapping frequency bands, common amplifier means connected to said noise filter means and responding exclusively to the noise powers of said respective signals and having an output providing information as to the relative values of said noise powers, noise-voltage separating means connected to the output of said common amplifier means for providing separate control voltages dependent upon the values of said noise powers in the signals of the respective receivers, said last-mentioned means being operatively connected to said control means to impose said control voltages thereupon to control the transmission of information signals from respective receivers to said output means.

2. Apparatus according to claim 1, wherein the separating means connected to the output of said common amplifier comprise band-pass filters with the same frequency bands as said first-mentioned filters, respectively.

3. Apparatus according to claim 2, wherein said filter frequency bands are outside the band of said information signals.

4. Apparatus according to claim 2, further comprising a detector connected between each of said second band-pass filters and a respective control means.

5. Apparatus according to claim 1, wherein said common amplifier means includes automatic gain control means providing constant power output from said amplifier means.

6. A receiving circuit for a radio communication installation comprising two receivers adapted to receive signals containing the same information, each receiver comprising a first output circuit for information signals and an amplifier having a control electrode connected to said first circuit, each receiver having a second output circuit for noise signals and comprising a band-pass filter, each of said filters passing a different band of non-overlapping frequencies located outside the band of frequencies of the information signals of the respective receiver, a common amplifier connected to the output of all said band-pass filters, a device for automatically controlling the gain of said common amplifier, a second set of band-pass filters connected to the output of said common amplifier, said second set of filters passing the same frequency bands as said first-mentioned filters respectively, a square law detector connected at the output of each of the filters of said second set, means to apply the output voltage of said square law detector to a control electrode of the corresponding first-mentioned amplifier, and means to collect the signals of said first-mentioned amplifiers in a common circuit.

7. A diversity reception system comprising a plurality of radio frequency receiving means, means effectively forming modulation-signal frequency channels having substantially the same bandwidth and substantially the same frequency limits for all the receiving means, each of said first-mentioned channels conveying a modulation signal, means effectively forming input-noise frequency channels having substantially the same bandwidth for all the receiving means and being spaced apart from one another in the frequency spectrum, each of said second-mentioned channels conveying an input noise signal, said input noise signals varying inversely with the amplitudes of the respective modulation signals, a common noise amplifier having an input connected to said input noise frequency channel means, an automatic gain control circuit for said common noise amplifier, means effectively forming output noise frequency channels having substantially the same bandwidth and substantially the same location in the frequency spectrum as the corresponding input-noise frequency channel means, said output-noise frequency channel means being connected to the output of said common noise amplifier, means in each output-noise frequency channel for rectifying the noise power thereof and producing a biasing voltage corresponding thereto, combining means including a plurality of variable-gain amplifying stages, means for impressing on each of said stages a modulation signal conveyed by a respective modulation-signal frequency channel pertaining to a respective receiving means and a biasing voltage derived from an output-noise frequency channel pertaining to the same receiving means, and adding means for combining the outputs of all said amplifying stages.

8. A diversity reception system comprising a plurality of radio frequency receiving means, means defining for each of said receiving means identical signal frequency channels each conveying a modulation signal, means defining for each of said receiving means noise frequency channels having the same bandwidth and spaced apart from one another in the frequency spectrum, each conveying a noise signal and each noise signal being associated with a modulation signal, a common amplifying means for amplifying the sum of the noise signals, means for controlling the gain of said amplifying means, means for selectively supplying the amplified noise signals to different frequency channels according to the receiving means from which they are derived, means for deriving from said frequency channelled noise signals control voltages proportional to said noise signals, and combiner amplifying means for amplifying each of said modulation signal inversely proportionally to the control voltage derived from the noise signal associated with the corresponding modulation signal.

9. A diversity reception system comprising a plurality of radio frequency receiving means, means defining modulation signal frequency channels having substantially the same bandwidth and substantially the same frequency limits for all the receiving means, each of said channels conveying a modulation signal, means defining input noise frequency channels having substantially the same bandwidth for all the receiving means and being spaced apart from one another in the frequency spectrum, each of said channels conveying an input noise signal, said input noise signals varying inversely with the amplitudes of the respective modulation signals, a common noise amplifier having an input connected to said input noise frequency channel defining means, an automatic gain control circuit for said common noise amplifier, means defining output noise frequency channels having the same bandwidth and respectively the same location in the frequency spectrum as the input noise frequency channel defining means, said output noise frequency channel defining means being connected to the output of said common noise amplifier, means in each output noise frequency channel for rectifying the noise power thereof and producing a biasing voltage corresponding thereto, combining means including a plurality of variable-gain amplifying stages, means for impressing on each of said stages a modulation signal conveyed by a modulation signal frequency channel pertaining to a receiving means and a biasing voltage derived from an output noise frequency channel pertaining to the same receiving means, and adding means for adding the outputs of all of said amplifying stages.

10. A diversity reception system comprising a plurality of radio frequency receiving means, means defining modulation signal frequency channels having substantially the same bandwidth and substantially the same frequency limits for all the receiving means, each of said channels conveying a modulation signal, means defining input noise frequency channels having substantially the same bandwidth for all the receiving means and being spaced apart from one another in the frequency spectrum, each of said channels conveying an input noise signal, said input noise signals varying inversely with the amplitudes of the respective modulation signals, a common noise amplifier having an input connected to said input noise frequency channel defining means, said common amplifier having a substantially linear amplification characteristic within a frequency band containing substantially all of the spaced bands of said input noise frequency channels, an automatic gain control circuit for said common noise amplifier, means defining output noise frequency channels having the same bandwidth and respectively the same location in the frequency spectrum as the input noise frequency channel defining means, said output noise frequency channel defining means being connected to the output of said common noise amplifier, means in each output noise frequency channel for rectifying the noise power thereof and producing a biasing voltage corresponding thereto, combining means including a plurality of variable-gain amplifying stages, means for impressing on each of said stages a modulation signal conveyed by a modulation signal frequency channel pertaining to a receiving means and a biasing voltage derived from an output noise frequency channel pertaining to the same receiving means, and adding means for adding the outputs of all of said amplifying stages.

11. A diversity reception system comprising a plurality of radio frequency receiving means, means defining for each of said receiving means identical signal frequency channels each conveying a modulation signal, means defining for each of said receiving means noise frequency channels having the same bandwidth and spaced apart from one another in the frequency spectrum outside the frequency band of the modulation signals, each noise frequency channel conveying a noise signal and each noise signal being associated with a modulation signal, common amplifying means for amplifying the sum of all of said noise signals, said amplifying means being essentially linear within the frequency range in which lie the bandwidths of said noise frequency channels, means for selectively supplying the amplified noise signals to different frequency channels according to the receiving means from which they are derived, means for deriving from said frequency-channelled noise signals control voltages proportional to said noise signals, and combiner amplifying means for amplifying each of said modulation signal inversely proportionally to the control voltage derived from the noise signal associated with the corresponding modulation signal.

12. In a wireless communication installation, a diversity receiving system comprising a plurality of receiver channels each comprising a receiver, an amplifier, a coupling circuit interconnecting said receiver and said amplifier to transmit a received information signal therebetween, and a noise filtering circuit in parallel with said coupling circuit for controlling the gain of said amplifier inversely proportionally to the noise power of said received signal, and a linear amplifier common to all channels connected in each of said noise filtering circuits between the receiver and amplifier of each channel, each of said noise filtering circuits including a first band-pass filter for passing noise frequencies, the pass-bands of the respective filters being different and non-overlapping with said common amplifier being connected to said filters as a common output from the latter, a second band-pass filter in each noise filtering circuit having a frequency band corresponding to said first-mentioned filter and connected in the output of said common amplifier, a detector connected to the output of said last-mentioned filter to provide a control voltage that is a function of the noise power of a respective receiver channel, and means for connecting said control voltage to a respective one of said first-mentioned amplifiers for varying the gain thereof inversely in accordance with said noise power.

References Cited in the file of this patent

UNITED STATES PATENTS

| | | |
|---|---|---|
| 2,055,992 | Yolles | Sept. 29, 1936 |
| 2,488,193 | Hughes | Nov. 15, 1949 |
| 2,896,205 | Berger | July 21, 1959 |
| 2,921,188 | Ringoen | Jan. 12, 1960 |
| 2,959,673 | Magnuski | Nov. 8, 1960 |